April 27, 1926.  W. A. RHODES  1,582,786

TWIN PACKING NUT

Filed July 2, 1925

WITNESSES
Edw. Thorpe
Chris Feinle

INVENTOR
William A. Rhodes
BY
ATTORNEYS

Patented Apr. 27, 1926.

1,582,786

UNITED STATES PATENT OFFICE.

WILLIAM A. RHODES, OF BROOKLYN, NEW YORK.

TWIN PACKING NUT.

Application filed July 2, 1925. Serial No. 41,153.

*To all whom it may concern:*

Be it known that I, WILLIAM A. RHODES, a citizen of the United States, and a resident of the city of New York, borough of Brooklyn, in the county of Kings and State of New York, United States of America, have invented a new and Improved Twin Packing Nut, of which the following is a full, clear, and exact description.

This invention relates to packings and similar devices such as stuffing boxes forming parts of valves.

The prime object of the present invention is to provide means by virtue of which a packing operation may be carried out without requiring the closing of a valve whose leaky condition necessitates its being packed.

Another object of the invention is the provision of a packing device adapted for use in conjunction with the valve stem neck or extension of a valve casing permitting the utilization of a single packing, and the provision of means by virtue of which an additional packing may be employed without requiring the closing of the valve in the event that the first packing has been materially affected by the pressure of the fluid to effectually prevent the escape of the fluid along the valve stem.

Another object of the invention is the provision of a packing device which may be economically produced to fit valve stem necks of different types of valves, which will be simple of construction, readily applicable for use, and effectual for carrying out the results looked for.

With the foregoing, other objects of the invention will appear from the embodiment of the invention, which by way of example is described in the following specification and illustrated in the accompanying drawing, in which—

Figure 1:
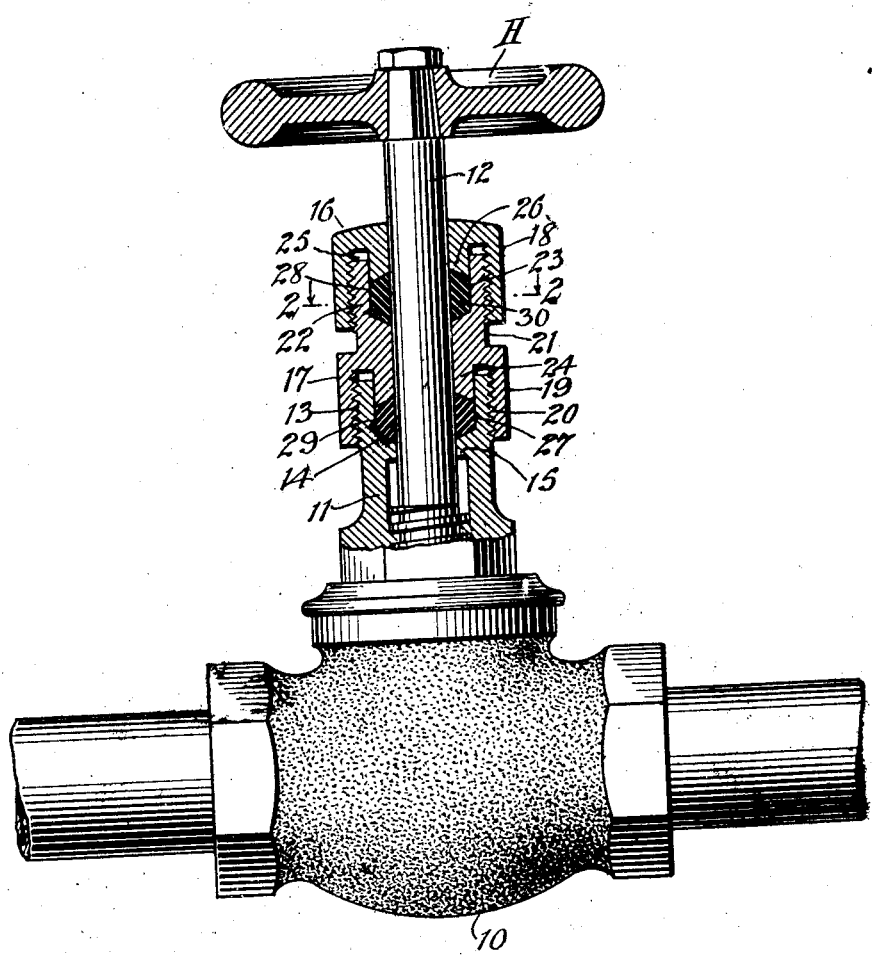
Figure 1 is a side elevation of a gate valve with the neck which surrounds the valve stem being broken away and showing the packing device of the present invention applied to said neck; the said packing device being shown in central vertical section.
Figure 2:
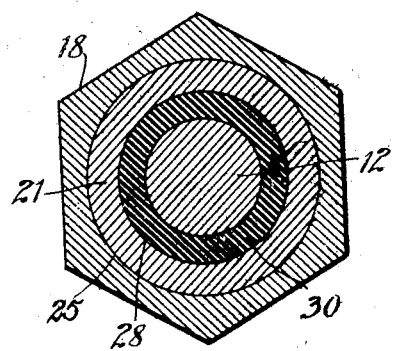
Fig. 2 is a transverse sectional view taken on the line 2—2 of Fig. 1.

Referring now more particularly to the views of the drawing, it will be apparent that, there has been shown a valve 10 which may be of any construction, but which must necessarily include as forming a part of the casing thereof a neck or extension 11 which surrounds the stem 12 of the valve, and which is externally screw threaded as at 13. The said neck or extension 11, as is usual, is provided with a bore or recess 14 and a gland 15 through which the stem 12 extends.

In order to combine with the neck or extension 11 and its appurtenances to make provision for the utilization of two separate and distinct packings, there is provided the packing device 16 of the present invention presently to be described. The said packing device 16 comprises a unit 17 and a unit 18. The units are adapted to be detachably connected together, and the device in its entirety is then adapted to be detachably connected to the extension 11 by means to be described. The unit 17, in the present instance, comprises a section 19 which has a screw threaded bore 20, and a reduced section 21 which is externally screw threaded as at 22, similarly to the bore 20 as to diameter and pitch of threads, the said section 21 also being provided with a bore or recess 23. The unit 17 is also formed to provide a gland 24 a portion of which extends into the bore 20 and is of smaller diameter than said bore to provide a space for the reception of the extremity of the neck or extension 11 when the unit 17 is applied thereto by virtue of the screw threads 13 of the extension 11 and the screw threads of the bore 20. The unit 17 is provided with "flats" for facilitating the application of the unit 17 by permitting the use of a wrench. The unit 18, in the present instance, is in the form of a cap nut and is provided with a screw threaded bore 25, and is also formed to provide a gland 26 adapted to fit within the bore or recess 23 of the unit 17 when the unit 18 is applied thereto. The diameter of the gland 26 is smaller than the diameter of the bore 25 to provide a space for the reception of the screw threaded end of the reduced section 21 of the unit 17. The unit 18 is also provided with flats for the application of a wrench thereto to facilitate the connection and separation of the unit 18.

From the foregoing it will be apparent that when the packing device of the present invention is applied to the neck or extension 11 which surrounds the valve stem 12 there is provided two packing spaces 27 and 28. The packing space 27 is defined by portions of the extension 11, gland 15, and gland 24. A suitable packing 29 is arranged in the space defined. Ordinarily the packing 29 will suffice for a certain period of time for preventing leakage. However, in the event that the packing 29 no longer suffices for preventing leakage due to its having been materially affected, the space 28 may be filled with a packing such as the packing 30 by removing the unit 18. The unit 18 may be removed after the hand wheel H has been first removed. The packing space 28 is defined by portions of the gland 24, gland 26, and section 21. Attention is now called to the fact that while the packing 30 is being applied it is not necessary to close the valve since the packing 29 though inadequate to prevent leakage is nevertheless capable of preventing an outrush of the fluid. After the packing 30 has been applied, any leak which existed prior thereto will be remedied and the valve will again be in proper working condition.

I claim:

A packing unit having a screw threaded bore in one end and a plain bore in the opposite end thereof, the end of said unit having the plain bore therein being externally screw threaded, the externally screw threaded end being equal in diameter to the diameter of the screw threaded bore and having a similar thread, and a gland extending into the screw threaded bore and being of smaller diameter than said screw threaded bore.

WILLIAM A. RHODES.